March 21, 1967 H. F. RAYFIELD ET AL 3,310,253

PNEUMATICALLY ACTUATED REEL HUB MECHANISM

Filed May 21, 1965 2 Sheets-Sheet 1

INVENTORS
HARRY F. RAYFIELD
HAROLD E. HASS
BY Christie, Parker & Hale
ATTORNEYS

PNEUMATICALLY ACTUATED REEL HUB MECHANISM

Filed May 21, 1965 2 Sheets-Sheet 2

INVENTORS.
HARRY F. RAYFIELD
HAROLD E. HASS
BY Christie, Parker & Hale
ATTORNEYS.

United States Patent Office 3,310,253

Patented Mar. 21, 1967

3,310,253

PNEUMATICALLY ACTUATED REEL HUB MECHANISM

Harry F. Rayfield, Arcadia, and Harold E. Hass, Temple City, Calif., assignors to Burroughs Corporation, Detroit, Mich., a corporation of Michigan Filed May 21, 1965, Ser. No. 457,772

14 Claims. (Cl. 242—68.3)

This invention relates to mechanisms for locking a reel to a rotatable hub and, more particularly, to a means for automatically locking a reel to a hub when the reel is properly in place on the hub.

Hub mechanisms are known wherein positive locking of a reel upon a hub is achieved by means of a compressible rubber ring within the reel bore. By comprising the ring in an axial direction, the ring is caused to expand in a radial direction thereby firmly locking the reel to the hub. In such a system, however, proper indexing of the reel upon the hub is not assured. If the reel is mounted upon the hub in a cocked fashion, it will be locked to the hub in the cocked position. In a magnetic tape system, for example, such misalignment of the tape reel may seriously interfere with, or in fact prevent, proper winding and unwinding of the tape upon the reel.

Additionally, in such arrangements the mounting of the reel upon the hub and the locking of the reel to the hub comprise two separate manual operations. Thus, if a forgetful operator mounts the reel upon the hub but neglects to lock the reel to the hub, the reel may fly off the hub, creating a danger to persons and property, upon the application of torque to the hub.

An advantage of the present invention is that it assures that a reel is properly mounted upon the hub before the reel is locked to the hub.

Another advantage of the present invention is that it automatically locks the reel to the hub rather than requiring a separate manual locking operation.

In addition to the above advantages, the present invention provides firm locking of the reel to the hub and permits ease and speed of mounting by an operator.

These and other advantages are achieved by means of a pneumatically actuated reel hub mechanism. A back plate adjacent the hub is affixed to a hollow main shaft which is driven by a drive pulley and belt arrangement. A pneumatic cylinder is combined with the drive pulley and when actuated, applies force to a pin affixed to a central shaft within the main shaft. A force plate which serves as one side of the hub is affixed to the central shaft and upon actuation of the cylinder compresses a rubber ring which serves to lock a reel to the hub. If the reel is properly positioned upon the hub, air channels within the back plate are sealed by the reel and the vacuum necessary to actuate the piston may be built up within the mechanism. If, on the other hand, the reel is not properly positioned on the hub, the air channels within the back plate will be open to the atmosphere thereby preventing the buildup of vacuum within the mechanism and the locking of the reel to the hub. Thus, the present invention assures that the reel is properly aligned when it is locked to the hub and automatically locks the reel to the hub when it is properly aligned.

The manner of operation of the present invention and the manner in which it achieves the above and other advantages may be more clearly understood by reference to the following detailed description when considered with the drawing in which.

Figure 1:
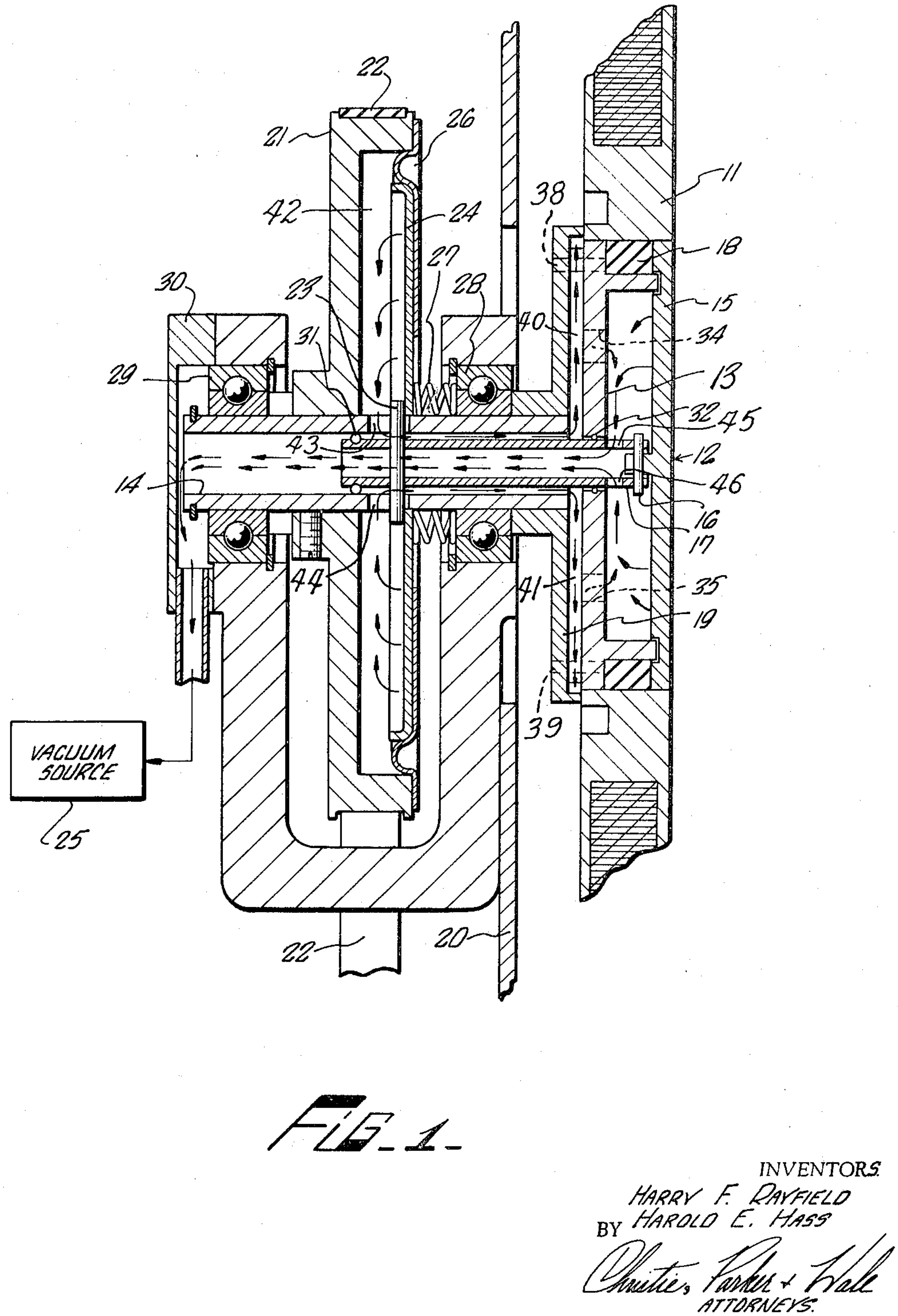
FIG. 1 depicts, partially in a sectional view, a preferred embodiment of the present invention.

FIG. 1 depicts a preferred embodiment of the automatically locking reel hub mechanism of the present invention. Reel 11 is shown positioned about hub 12. The hub 12 includes a first side 13 affixed to a hollow main shaft 14 and a second side 15 affixed by pin 16 to a hollow shaft 17 positioned within the main shaft 14. The two hub sides 13 and 15 have circular cross-sections of equal size. Hub side 13 is affixed to shaft 14 via grooved back plate 19. Back plate 19 may be affixed to shaft 14 by means of a conventional force fit and side 13 may be affixed to back plate 19 by any conventional means such as by pins 38 and 39. An expandable ring or loop 18 of rubber or other compressible material is positioned between the hub sides 13 and 15 near their circumference and is in contact with the bore of reel 11. Shafts 14 and 17 have a common axis and central shaft 17 is movable in an axial direction. As a result, hub side 15, pinned to shaft 17, is also movable and movement of side 15 toward side 13 utilizes side 15 as a force plate which compresses ring 18 in an axial direction thereby causing ring 18 to expand in a radial direction and firmly lock reel 11 to hub 12. Main shaft 14 is driven by a drive pulley and belt arrangement affixed to shaft 14 in a position along the shaft to the left of mounting panel 20, as viewed in FIG. 1. The drive pulley 21 is affixed to shaft 14 and the belt 22 supplies power to pulley 21 from a power source not shown in FIG. 1. An actuating piston 24 is in operating contact with a pin 23 which is affixed to shaft 17.

It may be seen from FIG. 1 that a leftward force applied to piston 24 will move central shaft 17 and hub side 15 in a leftward direction, as viewed in FIG. 1, and consequently will serve to lock reel 11 to hub 12. Such leftward movement of piston 24 is achieved by means of a vacuum established within a sealed air chamber within the reel hub mechanism of FIG. 1. This vacuum is established by means of vacuum source 25. Vacuum source 25 is shown in block diagram form and may comprise any well known means for selectively establishing a vacuum of predetermined intensity within an air chamber coupled to the vacuum source. An air chamber within which a vacuum is to be established must, of course, be sealed and the chamber within the mechanism of FIG. 1 is sealed, in part, by means of diaphragm 26 connected between pulley 21 and piston 24, and bellows seal 27 connected between piston 24 and bearing 28. Additionally, sealed bearing 29 and rear cover 30 provide a seal extending between the end of the main shaft 14 and vacuum source 25. A final seal between the air chamber and the atmosphere is provided by reel 11 when reel 11 is positioned flat against back plate 19 thereby sealing the grooved channels 40 and 41 within back plate 19. Thus, a vacuum may be established within the air chamber only when reel 11 is positioned flat against back plate 19. O-rings 31 and 32 provide additional air seals within the air chamber which insure proper air evacuation within the chamber upon the application of vacuum from source 25.

With reel 11 properly aligned about hub 12 it is positioned flat against back plate 19 and seals the grooved portions of back plate 19 from the atmosphere. As a result, the entire air chamber within the mechanism shown in FIG. 1 is sealed. Upon the application of vacuum from source 25 to the chamber, air within the chamber evacuates in a flow as indicated by the arrows shown in FIG. 1. Air within cavity 42 within the pulley 21 passes through holes 43 and 44 in main shaft 14 and thence in a highthand direction through main shaft 14 and into the channels 40 and 41 within back plate 19. Air flowing from within the pulley 21 flows in a rightward direction in shaft 14 as a result of the seal provided by O-ring 31. The air flow through the main shaft to the grooved portions of back plate 19 is prevented from passing directly into the portion of the chamber within hub 12 as a result of the seal provided by O-ring 32.

Figure 2:
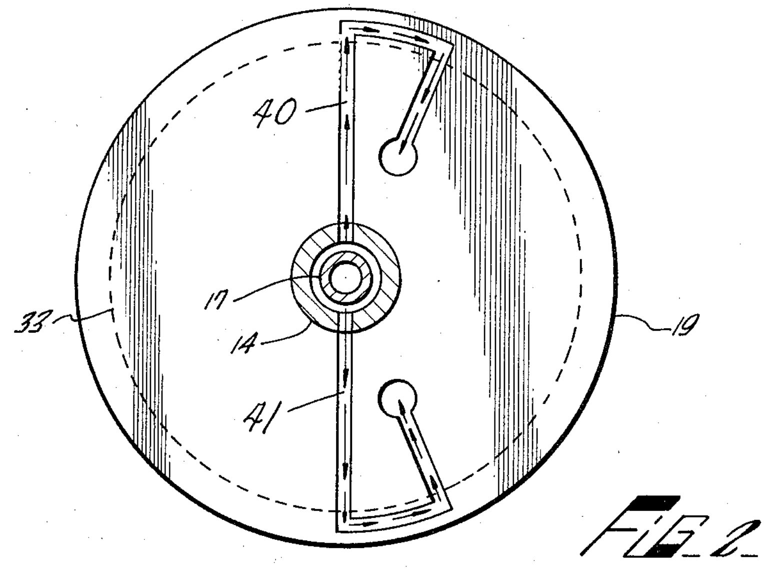
FIG. 2 depicts in detail the air channels within the hub back plate of the structure shown in FIG. 1.

Air flow within the channels of back plate 19 may be better understood by considering the back plate channel details shown in FIG. 2, along with the air flow as indicated in FIG. 1. Dotted circular line 33, shown in FIG. 2, indicates the edge of reel 11. Thus, portions of the grooves 40 and 41 shown in FIG. 2 to be outside of line 33 are sealed by reel 11 when the reel is positioned flat against back plate 19. When the grooved areas of back plate 19 are thus sealed by reel 11, air flows from main shaft 14 into the grooves, travels the entire length of these grooves and thence passes through holes 34 and 35 in hub side 13 into the portion of the air chamber within hub 12. All portions of the grooves inside line 33 except the ends thereof, which are adjacent holes 34 and 35, are sealed by hub side 13. Air within the portion of the air chamber within hub 12 thence passes through holes 45 and 46 in central shaft 17 into the hollow center of shaft 17, flows leftwardly through shaft 17 to the end of this shaft, thence into main shaft 14 to the end of that shaft and then to vacuum source 25.

As a result of the vacuum established within the air chamber, a leftward force is applied to piston 24 which drives the piston in a leftward direction causing central shaft 17 and hub side 15 also to move in a leftward direction, thereby locking reel 11 to hub 12. An additional leftward force is applied directly to hub side 15 as a result of the vacuum established within the portion of the air chamber inside hub 12, which additional force also tends to move side 15 in a leftward direction.

In an automatically locking hub reel mechanism according to the embodiment of the present invention shown in FIG. 1 and designed to be utilized in connection with a magnetic tape system, a pressure of one pound per square inch within the air chamber was determined to be sufficient to provide satisfactory locking of the reel to the hub.

Figure 3:
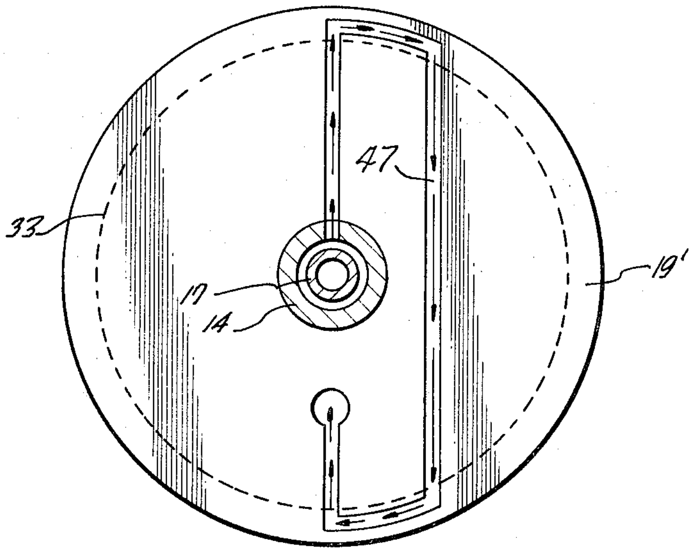
FIG. 3 depicts in detail a hub back plate having a different pattern of air channels which may be used alternatively with the back plate of FIG. 2.

The embodiment of the present invention, as shown in FIG. 1, and utilizing a back plate 19 having channels 40 and 41 therein, as shown in FIG. 2, will therefore automatically lock a reel to a hub upon the application of vacuum whenever the reel is properly positioned upon the hub. The two channel paths within back plate 19 as shown in FIG. 2, may be considered to be in parallel. It is, therefore, possible for one of these grooves to be sealed while the other is not. If, for example, the reel 11 is positioned on hub 12 in a cocked manner, such that one of the two paths is sealed but the other is not, it is possible that a partial vacuum will be established within the air chamber with the result that a partial locking of the reel to the hub may occur even though the reel is not properly positioned on the hub. A back plate having channels as indicated in the back plate shown in FIG. 3 will eliminate this problem. The back plate 19' shown in FIG. 3 has a single groove 47 therein which essentially represents a series connection of the two grooves shown in the back plate of FIG. 2. Since the back plate shown in FIG. 3 has a single groove which extends beyond the inner reel edge indicated by line 33 on opposite sides of back plate 19, this groove will not be sealed by the reel unless the reel is positioned so that it seals both of these portions of the groove. Thus, no sealing of the air chamber in the reel hub mechanism will take place unless the reel is properly positioned on the hub.

What has been described is considered to be only an illustrative embodiment of the present invention and, accordingly, it is to be understood that various and numerous other arrangements may be devised by one skilled in the art without departing from the spirit and scope of this invention. Thus, not only other arrangements in which a vacuum is established within a hub mechanism to lock a reel thereto but arrangements in which an increase in pressure is established within a hub mechanism to lock a reel thereto would clearly be within the scope of the present invention.

What is claimed is:

1. A means for locking a reel to a rotatable hub, comprising:
   - a hub having a first side affixed to a rotatable shaft and an axially movable second side;
   - a loop of compressible material positioned between the first and second sides;
   - a reel positioned about the hub;
   - movement of the second side toward the first side compressing the loop in an axial direction and causing the loop to expand in a radial direction thereby firmly locking the reel to the hub;
   - the second side affixed to a pneumatically actuated piston; and
   - pneumatic means for selectively actuating the piston.

2. A means for locking a reel to a rotatable hub according to claim 1 in which the pneumatic means comprises a vacuum source.

3. A means for locking a reel to a rotatable hub according to claim 1 further comprising:
   - a back plate adjacent the first side;
   - the reel making contact with the back plate when properly positioned about the hub; and
   - means for preventing actuation of the pneumatically actuated piston whenever the reel fails to make contact with the back plate.

4. A means for locking a reel to a rotatable hub comprising:
   - a hub having a first side affixed to a rotatable shaft and an axially movable second side;
   - a rubber loop positioned between the first and second sides;
   - a reel positioned about the hub;
   - movement of the second side toward the first side compressing the loop in an axial direction and causing the loop to expand in a radial direction thereby firmly locking the reel to the hub;
   - drive means having an air space therein affixed to the rotatable shaft;
   - a pneumatically actuated piston positioned within airspace;
   - means connecting the piston and the movable second side; and
   - means for changing the air pressure within the airspace to actuate the piston.

5. A means for locking a reel to a rotatable hub comprising:
   - a hub having a first side affixed to a rotatable hollow shaft and an axially movable second side, the two sides having circular cross-sections of equal size;
   - a rubber ring positioned between the two sides near their circumferences;
   - a reel positioned about the hub;
   - the second side affixed to a pneumatically actuated piston positioned within the shaft; and
   - vacuum means for selectively actuating the piston to move the second side toward the first side thereby causing the ring to compress in an axial direction and expand in a radial direction to firmly lock the reel to the hub.

6. A means for locking a reel to a rotatable hub according to claim 5 further comprising:
   - a back plate adjacent the first side;
   - the reel making contact with the back plate when properly positioned about the hub; and
   - means for preventing the vacuum means from actuating the piston whenever the reel fails to make contact with the back plate.

7. A means for locking a reel to a rotatable hub, comprising:

a hub having a first side affixed to a rotatable hollow shaft and an axially movable second side, the two sides having circular cross-sections of equal size;

a rubber ring positioned between the two sides near their circumferences; an air space existing between the first and second sides;

a reel positioned about the hub;

drive means having an air space therein affixed to the rotatable shaft;

holes in the hollow shaft connecting the air space within the drive means with the air space between the first and second sides;

means for creating a vacuum within the air spaces; and means responsive to vacuum within the air spaces for moving the second side toward the first side thereby causing the ring to compress in an axial direction and expand in a radial direction to firmly lock the reel to the hub.

8. A means for locking a reel to a rotatable hub according to claim 7 in which the means for creating a vacuum comprises means for sealing the air spaces when the reel is properly positioned about the hub.

9. An automatically locking reel hub mechanism comprising:

a reel positioned about a rotatable hub;

one side of the hub affixed to a rotatable hollow shaft;

the other side of the hub being axially movable;

a rubber ring positioned between the two sides near the reel; an air space existing between the first and second sides;

a grooved back plate affixed to the hollow shaft and adjacent the first side;

a single air chamber within the mechanism including the hollow portion of the shaft, the air space between the hub sides, and the grooved portions of the back plate;

means for sealing the air chamber whenever the reel is properly positioned on the hub;

means for creating a vacuum within the sealed air chamber; and means responsive to a vacuum within the air chamber for moving the second side toward the first side thereby causing the ring to compress in an axial direction and expand in a radial direction to firmly lock the reel to the hub.

10. An automatically locking reel hub mechanism according to claim 9 in which the back plate has a groove leading from the hollow shaft to a portion of the plate beyond the edge of the first hub side, the portion of the groove beyond the edge of the first hub side being sealable by the side of the reel.

11. An automatically locking reel hub mechanism comprising:

a reel positioned about a rotatable hub;

one side of the hub affixed to a rotatable hollow main shaft;

the other side of the hub affixed to one end of a hollow central shaft positioned within the main shaft;

the central shaft being coaxial with the main shaft and movable in an axial direction;

both sides of the hub having circular cross-sections of equal size;

a rubber ring positioned between the two hub sides near their circumferences;

an air space existing between the two hub sides;

a grooved back plate affixed to the main shaft and adjacent the one hub side; the grooved portion of the plate extending beyond the edge of the one hub side;

drive means having an air space therein affixed to the main shaft;

the entire mechanism having a single air chamber therein which includes the air spaces within the two shafts, the air sace within the drive means, the air space between the hub sides and the grooved portions of the back plate;

means for sealing the air chamber except for the grooved portions of the back plate extending beyond the edge of the one hub side;

the grooved portions of the back plate being sealed by the reel when the reel is positioned flat against the back plate;

means for selectively creating an air pressure differential within the air chamber when sealed by the reel being positioned flat against the back plate; and means responsive to an air pressure differential within the air chamber for moving the central shaft toward the drive means to cause the rubber ring to expand in a radial direction and hightly lock the reel to the hub.

12. An automatically locking reel hub mechanism according to claim 11 in which the means for creating an air pressure differential within the sealed air chamber comprises means for creating a vacuum within the sealed chamber.

13. An automatically locking reel hub mechanism according to claim 12 further comprising means for causing air evacuated from the chamber in response to the effectuation of a vacuum therein to flow from the air space within the drive means, thence through the grooved portion of the back plate, thence through the air space between the hub sides, thence through the central shaft, and thence out the main shaft to the vacuum creating means.

14. An automatically locking reel hub mechanism according to claim 13 in which the means responsive to an air pressure differential within the air chamber for moving the central shaft comprises a vacuum actuated piston in contact with the air space within the drive means and actated by the creation of a vacuum in that air space.

References Cited by the Examiner

UNITED STATES PATENTS 2,998,206 8/1961 Pendleton ------- 242—68.3 X

FRANK J. COHEN, *Primary Examiner.*

N. L. MINTZ, *Assistant Examiner.*